United States Patent
Hirose

(10) Patent No.: US 9,696,181 B2
(45) Date of Patent: Jul. 4, 2017

(54) DISPLAY DEVICE, ENERGY DISPLAY METHOD AND COMPUTER PROGRAM

(75) Inventor: Yukiyoshi Hirose, Tokyo (JP)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 13/403,411

(22) Filed: Feb. 23, 2012

(65) Prior Publication Data

US 2012/0242500 A1 Sep. 27, 2012

(30) Foreign Application Priority Data

Mar. 24, 2011 (JP) .................. 2011-065916

(51) Int. Cl.
G08C 15/06 (2006.01)
G01D 4/00 (2006.01)

(52) U.S. Cl.
CPC ............ *G01D 4/002* (2013.01); *Y02B 90/241* (2013.01); *Y04S 20/32* (2013.01); *Y04S 20/46* (2013.01)

(58) Field of Classification Search
CPC ......... G01D 4/004; H04Q 9/00; Y02B 90/242
USPC .................................... 340/870.02
See application file for complete search history.

(56) References Cited

U.S. PATENT DOCUMENTS 4,644,320 A * 2/1987 Carr et al. ................. 340/12.37
5,485,620 A * 1/1996 Sadre et al. .................. 717/162
2002/0059617 A1 5/2002 Terakado et al.
2002/0063633 A1 5/2002 Park
2003/0034900 A1 2/2003 Han
2004/0225648 A1* 11/2004 Ransom et al. .................. 707/3
2007/0262763 A1* 11/2007 Suzuki .......................... 323/284
2015/0204691 A1 7/2015 Salter

FOREIGN PATENT DOCUMENTS

| CN | 1356808 | 7/2002 |
|---|---|---|
| CN | 101765758 | 6/2010 |
| JP | 2002-369382 | 12/2002 |
| JP | 2004-062359 | 2/2004 |
| JP | 2006-060360 | 3/2006 |
| JP | 2007-133523 | 5/2007 |
| JP | 2008-079076 | 4/2008 |
| JP | 2009-130983 | 6/2009 |
| JP | 2010-161848 | 7/2010 |
| JP | 2010-288389 | 12/2010 |

OTHER PUBLICATIONS

Chinese Office Action issued Jul. 3, 2015, for corresponding Chinese Appln. No. 2012100720060 (19 pages).

* cited by examiner

*Primary Examiner* — Yong Hang Jiang
(74) *Attorney, Agent, or Firm* — K&L Gates LLP

(57) ABSTRACT

A display device includes: an image display section which displays an image on a screen on the basis of an image signal; and an execution section which executes an application which is acquired from a network on the basis of a user's instruction. When the image display section displays an image, the application which is executed by the execution section acquires, through the network, information related to energy that is used in a predetermined range, and displays the information on the screen.

6 Claims, 8 Drawing Sheets

DISPLAY DEVICE, ENERGY DISPLAY METHOD AND COMPUTER PROGRAM

CROSS REFERENCES TO RELATED APPLICATIONS

The present application claims priority to Japanese Priority Patent Application JP 2011-065916 filed in the Japan Patent Office on Mar. 24, 2011, the entire content of which is hereby incorporated by reference.

BACKGROUND

The present disclosure relates to a display device, an energy information display method, and a computer program.

Hitherto, in order to confirm the usage of electricity, gas, and water, it has been necessary to check a meter attached to measuring equipment or display equipment. In general, the meter and the display equipment are installed outside a house, and it is necessary to move outside the house from the inside of the house in order to confirm the usage of electricity, gas, and water.

Therefore, if it is possible to confirm the usage of electricity, gas, and water while remaining the house or remotely while not in the house, it is very convenient for the owner of the house, and related techniques are also disclosed. For example, Japanese Unexamined Patent Application Publication No. 2009-130983 discloses a technique of confirming the usage of energy through a network even when the owner is not in the house.

SUMMARY

In view of such circumstances, there is more demand to be able to confirm the information related to energy that is used in the home and the like through a simple procedure while remaining in the house and the like, or remotely while not in the house and the like.

It is desirable to provide a new and improved display device, an energy information display method, and a computer program which can acquire the information related to energy that is used in the home and the like via a network and display the information on a screen.

According to an embodiment of the present disclosure, there is provided a display device including: an image display section which displays an image on a screen on the basis of an image signal; and an execution section which executes an application which is acquired from a network on the basis of a user's instruction, in which when the image display section displays an image, the application which is executed by the execution section acquires, through the network, information related to energy that is used in a predetermined range, and displays the information on the screen.

According to the embodiment of the present disclosure, the image display section displays an image based on an image signal on the screen. The execution section executes an application which is acquired from the network on the basis of a user's instruction. When the image display section displays an image on the screen, the execution section acquires, through the network, information related to energy that is used in a predetermined range, and displays the information on the screen.

In addition, according to another embodiment of the present disclosure, there is provided an energy display method including: displaying an image on a screen on the basis of an image signal; and executing an application which is acquired from a network on the basis of a user's instruction, in which when an image is displayed on the screen in the image display operation, the application which is executed in the execution operation acquires, through the network, information related to energy that is used in a predetermined range, and displays the information on the screen.

In addition, according to a further embodiment of the present disclosure, there is provided a computer program causing a computer to execute: displaying an image on a screen on the basis of an image signal; and executing an application which is acquired from a network on the basis of a user's instruction, in which when an image is displayed on the screen in the image display operation, the application which is executed in the execution operation acquires, through the network, information related to energy that is used in a predetermined range, and displays the information on the screen.

As described above, according to the embodiments of the present disclosure, a new and improved display device, an energy information display method, and a computer program which can acquire the information related to energy that is used in the home and the like via a network and display the information on a screen are provided.

Additional features and advantages are described herein, and will be apparent from the following Detailed Description and the figures.

DETAILED DESCRIPTION

Hereinafter, preferred embodiments of the present disclosure will be described in detail with reference to the accompanying drawings. In this specification and the drawings, constituent elements having substantially the same functional configuration will be denoted by the same reference numbers to omit.

The description will be given in the following order.
<1. Embodiment of Present Disclosure>
[1-1. Example of Entire Configuration of System]
[1-2. Functional Configuration of TV]
[1-3. Example of Screen which is Displayed on TV]
[1-4. Operation of TV]
[1-5. Functional Configuration of Information Processor]
<2. Conclusion>

<1. Embodiment of Present Disclosure>

[1-1. Example of Entire Configuration of Energy Display System]

Figure 1:
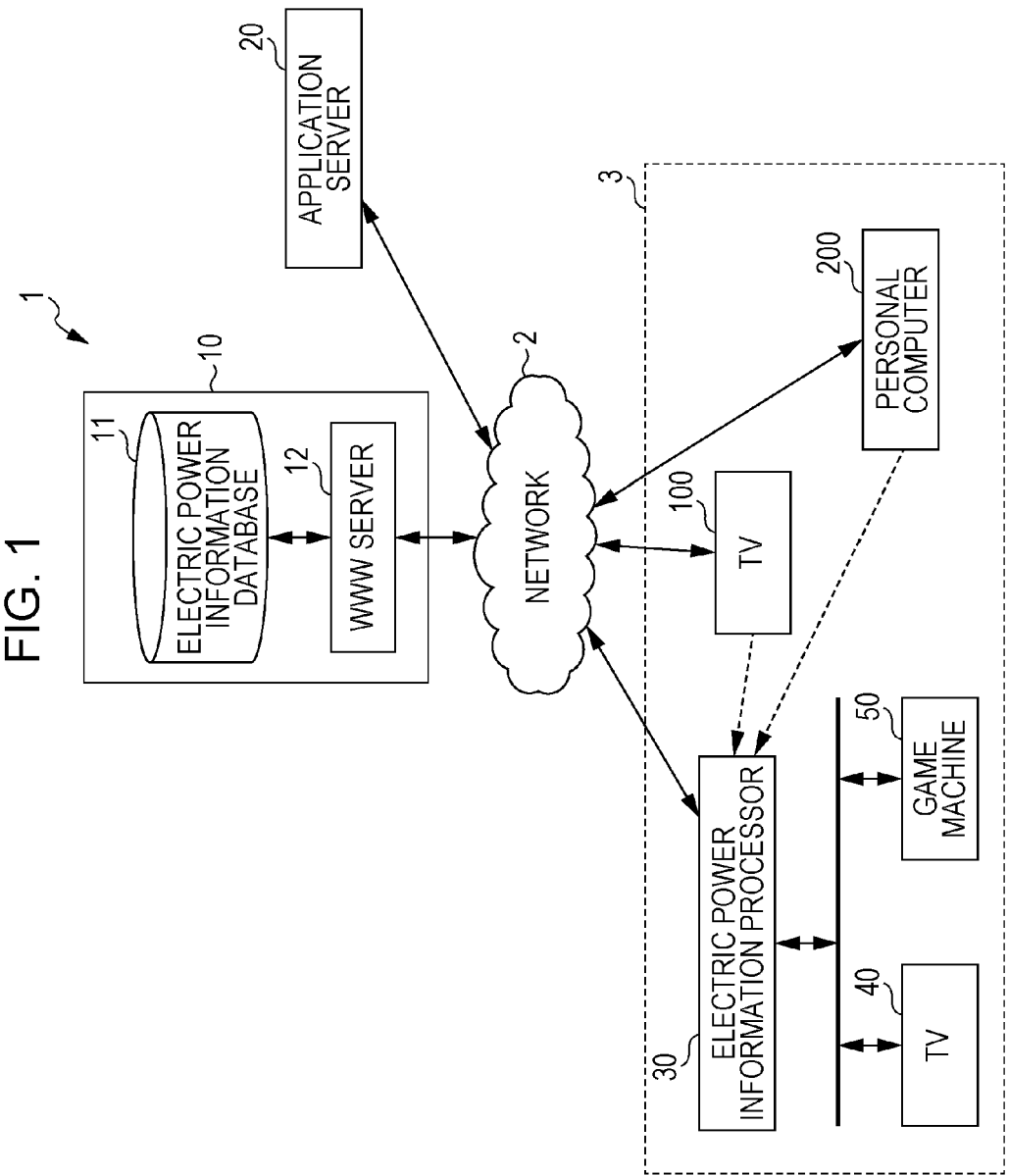
FIG. 1 is a diagram illustrating an example of the entire configuration of an energy display system including a display device according to an embodiment of the present disclosure.

First, an example of the entire configuration of an energy display system including a display device according to an embodiment of the present disclosure will be described with reference to the drawing. FIG. 1 is a diagram illustrating an example of the entire configuration of an energy display system including a display device according to an embodiment of the present disclosure. Hereinafter, an example of the entire configuration of an energy display system including a display device according to an embodiment of the present disclosure will be described using FIG. 1.

As shown in FIG. 1, an energy display system 1 according to an embodiment of the present disclosure includes an electric power information server 10, an application server 20, an electric power information processor 30, a TV 40, a game machine 50 and other electronic equipment, a TV 100, and a personal computer 200 and other display devices.

The energy display system 1 according to an embodiment of the present disclosure is a system which can display the electric power usage of the TV 40, the game machine 50 and other electronic equipment which are installed in a home 3 and which can control the electronic equipment by using the TV 100, the personal computer 200 and other display devices which are installed in the home 3.

The electric power information server 10 acquires the electric power usage of the TV 40, the game machine 50 and other electronic equipment which are installed in the home 3, and discloses the electric power usage information on demand from the TV 100, the personal computer 200 and other display devices. As shown in FIG. 1, the electric power information server 10 includes an electric power information database 11 and a world wide web (WWW) server 12. The electric power information database 11 is a database in which the electric power usage information of the TV 40, the game machine 50 and other electronic equipment is stored. The electric power usage information that is transmitted through a network 2 from the electric power information processor 30 provided in the home 3 is stored in the electric power information database 11. The WWW server 12 is interposed between the network 2 and the electric power information database 11. The electric power information database 11 can be accessed from the TV 100, the personal computer 200 and other display devices through the WWW server 12.

The application server 20 stores an application for acquiring the electric power usage information stored in the electric power information database 11 by using the TV 100, the personal computer 200 and other display devices. The TV 100, the personal computer 200 and other display devices can acquire the electric power usage information stored in the electric power information database 11 by downloading the application through the network 2 from the application server 20.

In the electric power information processor 30, the electric power usage information of the TV 40, the game machine 50 and other electronic equipment is stored. The pieces of electric power usage information are stored in the electric power information processor 30 in association with the respective pieces of electronic equipment.

The TV 100 and the personal computer 200 are devices which can display various videos, images and information. The TV 100 and the personal computer 200 according to this embodiment can acquire and display the electric power usage information stored in the electric power information database 11. The TV 100 and the personal computer 200 according to this embodiment download an application from the application server 20. When the application has been downloaded, the TV 100 and the personal computer 200 access the application server 20 to determine whether or not the application has been updated. Using the application, the TV 100 and the personal computer 200 acquire and display the electric power usage information stored in the electric power information database 11.

The application which is stored in the application server 20 for acquiring and displaying the electric power usage information stored in the electric power information database 11 by using the TV 100, the personal computer 200 and other display devices is an application which is executed in a widget form in the display device. That is, for example, when the electric power usage information stored in the electric power information database 11 is acquired and displayed by using the TV 100, the TV 100 displays a video based on a broadcast wave by receiving the broadcast wave, and simultaneously acquires and displays the electric power usage information by starting-up the application. Accordingly, a user of the TV 100 can confirm the electric power usage information which is acquired by the electric power information processor 30 and stored in the electric power information database 11 while watching the video.

In the electric power information database 11, information for controlling the electronic equipment which is managed by the electric power information processor 30 is also stored as well as the electric power usage information. The value of the information for controlling the electronic equipment is written by the application which is downloaded to the TV 100 from the application server 20. The electric power information processor 30 accesses the electric power information database 11 through the WWW server 12 and detects a change in the value of the information, thereby controlling the operation of the electronic equipment such as the TV 40 or the game machine 50 which is managed by the electric power information processor 30.

As described above, an example of the entire configuration of the energy display system including the display device according to an embodiment of the present disclosure has been described using FIG. 1. Next, the functional configuration of the TV 100 according to an embodiment of the present disclosure will be described.

[1-2. Functional Configuration of TV]

Figure 2:
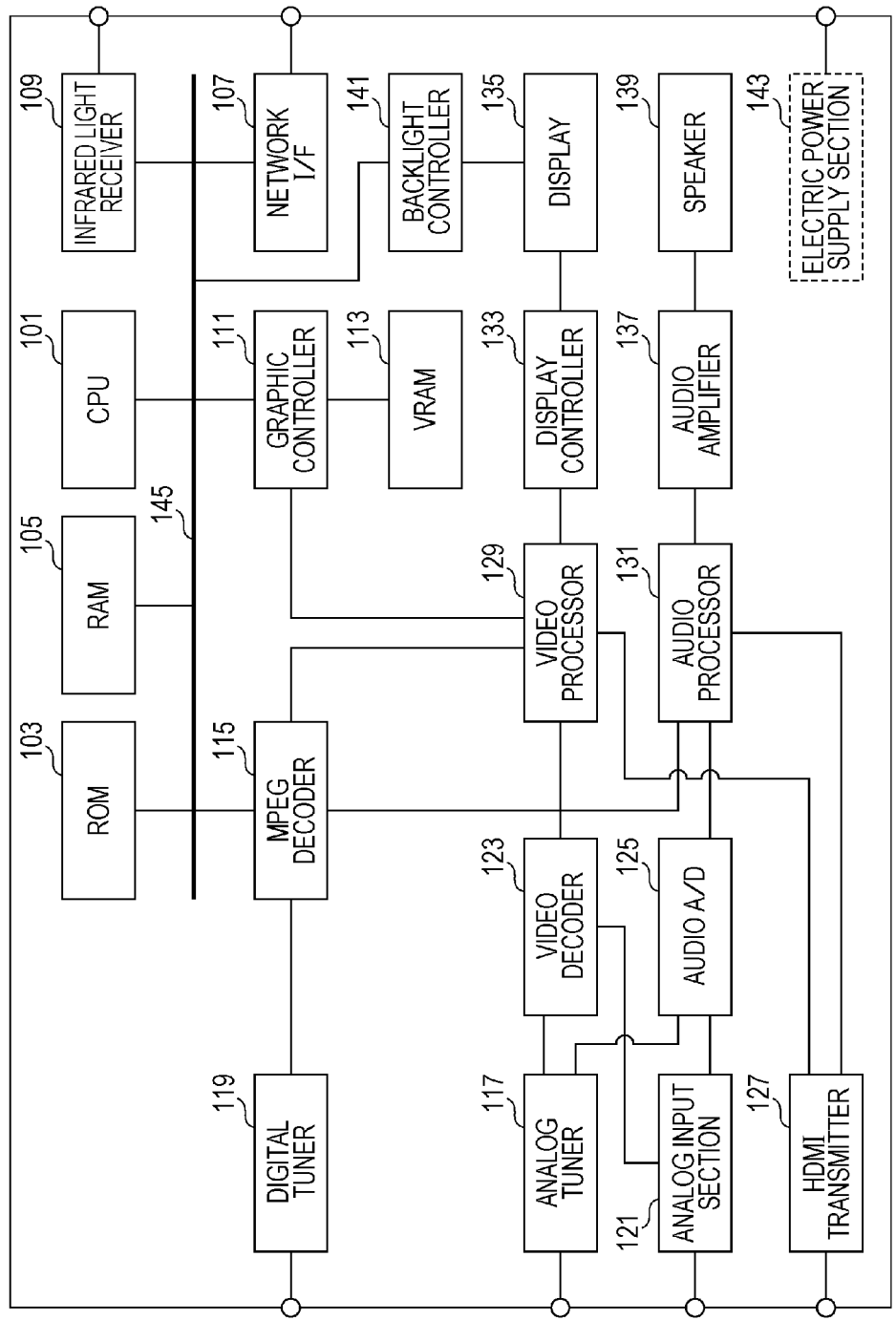
FIG. 2 is a diagram illustrating the functional configuration of a TV according to an embodiment of the present disclosure.

FIG. 2 is a diagram illustrating the functional configuration of the TV 100 according to an embodiment of the present disclosure. Hereinafter, the functional configuration of the TV 100 according to an embodiment of the present disclosure will be described using FIG. 2.

As shown in FIG. 2, the TV 100 according to an embodiment of the present disclosure which is a display device is a liquid crystal display (LCD) TV. The TV 100 includes a CPU 101, a ROM 103, a RAM 105, a network I/F 107, an infrared light receiver 109, a graphic controller 111, a VRAM 113, and a MPEG decoder 115. The TV 100 includes an analog input section 121, a video decoder 123, an audio A/D 125, a HDMI transmitter 127, a video processor 129, an audio processor 131, a display controller 133, a display 135, an audio amplifier 137, a speaker 139, a backlight controller 141, an electric power supply section 143, and a system bus 145, as well as an analog tuner 117 and a digital tuner 119.

The analog input section 121 is used to input an analog video and audio signal from external equipment. The video decoder 123 and the audio A/D 125 convert an analog video and audio signal into a digital signal. The HDMI transmitter 127 is used to input a digital video and audio signal from external video equipment corresponding to HDMI.

The video and audio signal which is input from the tuner 117 or 119, the analog input section 121, or the HDMI transmitter 127 is directly or indirectly input to the video processor 129 and the audio processor 131 to output the video and audio signal designated by a user to the display controller 133 and the audio amplifier 137.

The video processor 129 executes various processes for displaying video information corresponding to video data.

The display controller 133 generates a timing signal for pixel driving and a video data signal on the basis of vertical and horizontal synthesis signals of the video signal input from the video processor 129, and supplies the signals to the display 135.

The display 135 includes, for example, a liquid crystal panel, an optical film, a backlight, and a reflection plate. The liquid crystal panel is equipped with, for example, a circuit for pixel driving and a circuit for backlight driving. The optical film optically adjusts the diffusion of the light from the backlight, and the like. The reflection plate reflects the light from the backlight to the side of the liquid crystal panel.

The display controller 133 controls the circuit for pixel driving and supplies a signal to the circuit for backlight driving to adjust the light intensity of the entire backlight. A dimming signal for the backlight is generated by the video processor 129 on the basis of the video signal characteristics and the luminance setting value of the display 135.

The HDMI transmitter 127 receives video information and control information from STB 200. The display 135 displays the video information in at least a part of the display region of the display 135. The CPU 101 develops and executes a processing program stored in the ROM 103 on the RAM 105 to control the entire TV 100. The processing program includes an application for executing the display method according to an embodiment of the present disclosure.

The TV 100 according to an embodiment of the present disclosure can be connected to the WWW server 12 and the application server 20 through the network I/F 107. The TV 100 downloads an application for acquiring and displaying the electric power usage information stored in the electric power information database 11 from the application server 20, and develops the application on the RAM 105. The application developed on the RAM 105 is executed by the CPU 101 and is thus displayed in a part of the display region of the display 135. Accordingly, the TV 100 can acquire and display the electric power usage information stored in the electric power information database 11, and a user of the TV 100 can see the electric power usage information while watching the video based on the video signal which is supplied to the digital tuner 119, the analog tuner 117, and the HDMI transmitter 127.

As described above, the functional configuration of the TV 100 according to an embodiment of the present disclosure has been described using FIG. 2. Next, an example of a screen which is displayed on the TV 100 according to an embodiment of the present disclosure will be described.

[1-3. Example of Screen which is Displayed on TV]

Figure 3:
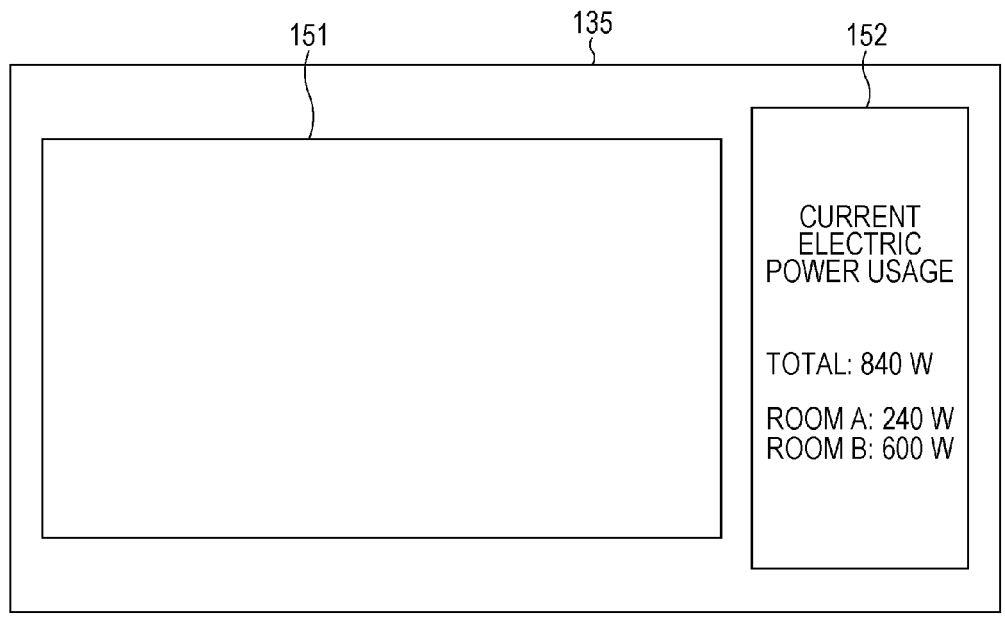
FIG. 3 is a diagram illustrating an example of a screen which is displayed on the TV according to an embodiment of the present disclosure.

FIG. 3 is a diagram illustrating an example of a screen which is displayed on the TV 100 according to an embodiment of the present disclosure. FIG. 3 shows an example of a screen which is displayed when the electric power usage information stored in the electric power information database 11 is acquired and displayed.

As described above, when the electric power usage information stored in the electric power information database 11 is acquired and displayed, the TV 100 downloads an application stored in the application server 20 and acquires and displays the information by using the application. As shown in FIG. 3, the electric power usage information is displayed in an energy information display region 152 next to a video display region 151 displaying a video, or superimposed on the video. Accordingly, a user of the TV 100 can confirm the electric power usage information which is acquired by the electric power information processor 30 and stored in the electric power information database 11 while watching the video.

The content which is displayed by such an application may include total electric power usage (of the equipment which is managed by the electric power information processor 30) of the home 3, electric power usage of each room, an instantaneous value of electric power usage for each piece of the equipment, hourly, daily, weekly and monthly history of electric power usage of the equipment, an integrated value of electric power usage of the equipment, and the like. These pieces of information may be displayed by such an application by using display ones such as numerical values and graphs.

The content which is displayed by such an application is not limited to the electric power usage, and for example, information concerning gas usage and water usage may be displayed if it is acquired by the electric power information processor 30.

As described above, an example of the screen which is displayed on the TV 100 according to an embodiment of the present disclosure has been described. Next, an operation of the energy display system 1 according to an embodiment of the present disclosure will be described.

[4-1. Operation of Energy Display System]

Figure 4:
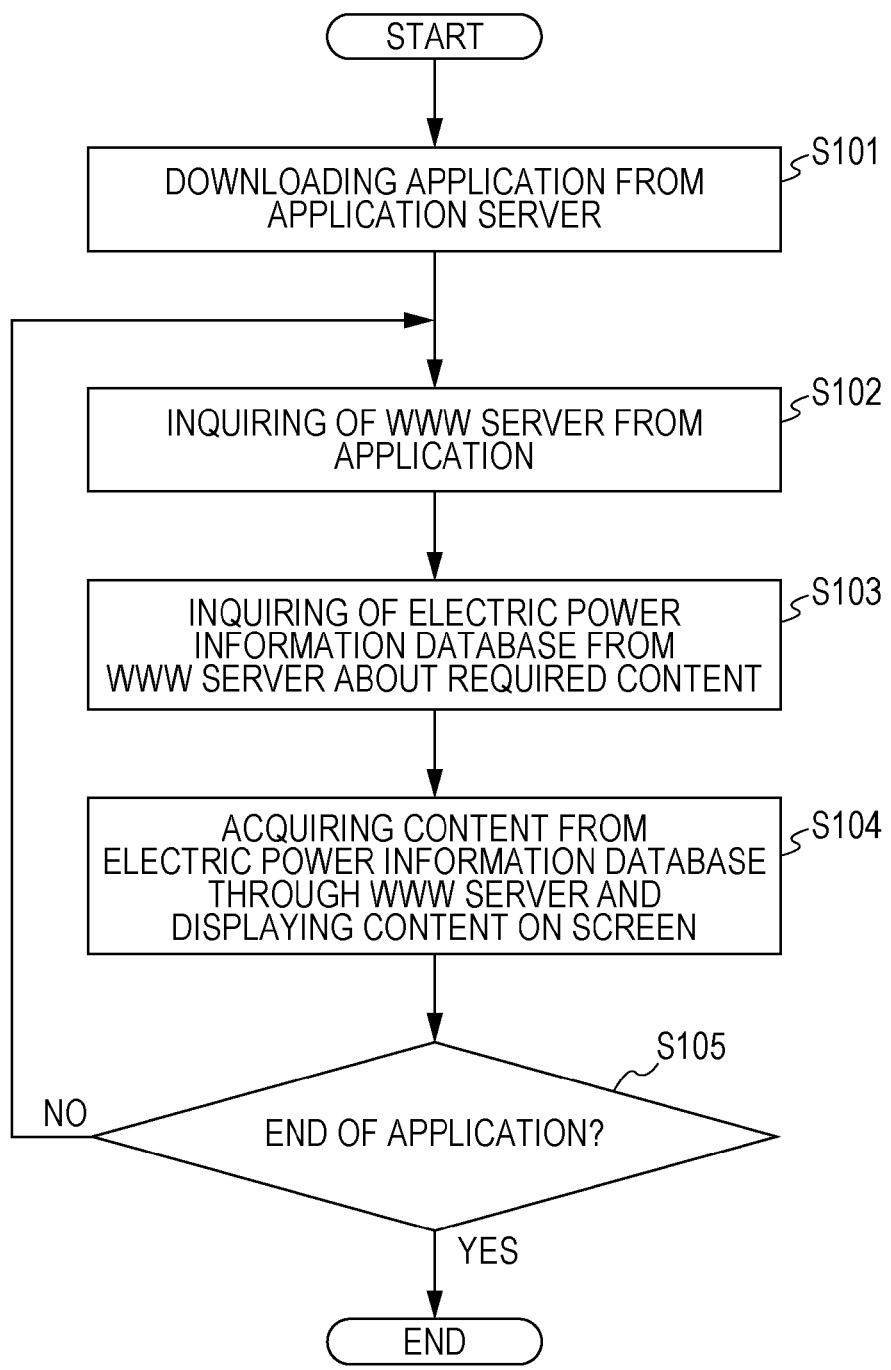
FIG. 4 is a flowchart showing an operation of an energy display system according to an embodiment of the present disclosure.

FIG. 4 is a flowchart showing an operation of the energy display system 1 according to an embodiment of the present disclosure. The flowchart shown in FIG. 4 shows an operation when acquiring and displaying the electric power usage information by using the TV 100. Hereinafter, the operation of the energy display system 1 according to an embodiment of the present disclosure will be described using FIG. 4.

In order to acquire and display the electric power usage information stored in the electric power information database 11 by using the TV 100, first, an application for acquiring and displaying the electric power usage information is started-up by a predetermined operation. Here, if the application for acquiring and displaying the electric power usage is not stored in the TV 100, such an application is acquired by access to the application server 20 from the TV 100 (Step S101). Regarding the acquisition source for the application, it may be recorded in the TV 100 in advance, or an application server storing the application may be retrieved from the TV 100 and specified.

When the TV 100 downloads and acquires the application for acquiring and displaying the electric power usage information from the application server 20 in the above-described Step S101, the application accesses the WWW server 12 and makes a request to acquire the electric power usage information from the electric power information database 11 (Step S102). Here, the application may make a request to the WWW server 12 to acquire the electric power usage information of all or some pieces of the electronic equipment which are managed by the electric power information processor 30 on the basis of the operation of a user. In addition, the application may be associated with the electric power information processor 30 so as to acquire the electric power usage information of the electronic equipment which is managed by the electric power information processor 30.

In the above-described Step S102, when the application accesses the WWW server 12 and makes a request to acquire the electric power usage information from the electric power information database 11, the WWW server 12 receiving the request inquires of the electric power information database 11 about the requested content on the basis of the request (Step S103).

In the above-described Step S103, when the WWW server 12 inquires of the electric power information database 11 about the requested content on the basis of the request from the application, the electric power information database 11 returns the electric power usage information to the WWW server 12 in accordance with the inquiry from the WWW server 12. The WWW server 12 returns the content returned from the electric power information database 11 to the application which has made the request. The application receiving the reply from the WWW server 12 displays the content on the screen (Step S104). The content displayed on the screen is, for example, as shown in FIG. 3.

Thereafter, the TV 100 determines whether or not the application which displays the electric power usage information is ended by a user (Step S105). As a result of the determination in Step S105, when the application is not ended, the process returns to the above-described Step S102 to make a request on a regular basis or on the basis of an instruction from a user so as to acquire the electric power usage information from the electric power information database 11. On the other hand, as a result of the determination in Step S105, when the application is ended, the process ends.

In this manner, in order to acquire and display the electric power usage information stored in the electric power information database 11 by using the TV 100, a predetermined application is downloaded from the application server 20 and the electric power usage information is acquired from the electric power information database 11 by the application. Accordingly, the TV 100 can acquire the electric power usage information of the electronic equipment which is managed by the electric power information processor 30 and display the information on the screen by using the application, and a user can see the electric power usage information together with the video which is displayed on the TV 100.

The application which is acquired by downloading from the application server 20 can not only acquire and display the electric power usage information, but also change information, which is stored in the electric power information database 11, for controlling the electronic equipment which is managed by the electric power information processor 30 as described above. Accordingly, the electric power information processor 30 can control the operation of the electronic equipment which is managed by the electric power information processor 30.

Figure 5:
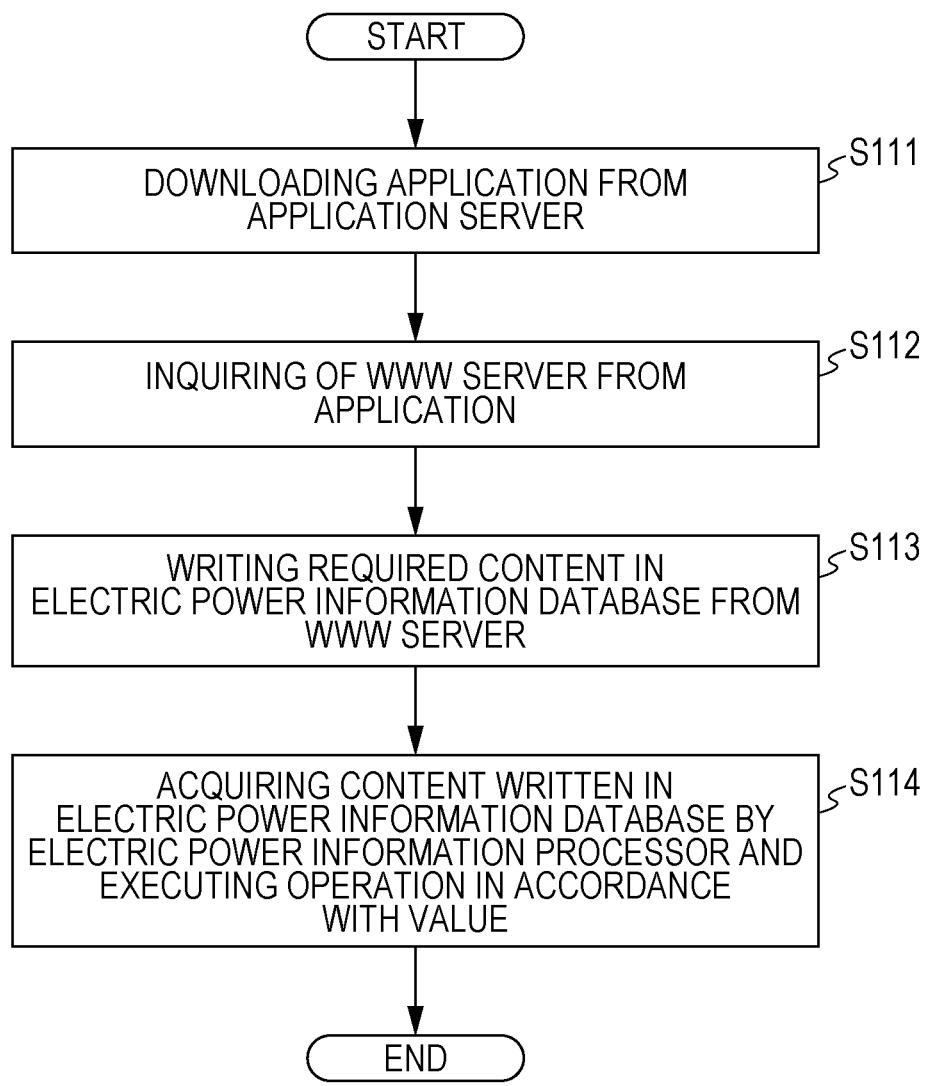
FIG. 5 is a flowchart showing an operation of the energy display system according to an embodiment of the present disclosure.

FIG. 5 is a flowchart showing an operation of the energy display system 1 according to an embodiment of the present disclosure. The flowchart shown in FIG. 5 shows an operation when controlling the operation of the electronic equipment which is managed by the electric power information processor 30 by using the TV 100. Hereinafter, the operation of the energy display system 1 according to an embodiment of the present disclosure will be described using FIG. 5.

In order to control the operation of the electronic equipment which is managed by the electric power information processor 30 by using the TV 100, first, an application for controlling the operation of the electronic equipment which is managed by the electric power information processor 30 is started-up by a predetermined operation. Here, if the application for controlling the operation of the electronic equipment which is managed by the electric power information processor 30 is not stored in the TV 100, such an application is acquired by access to the application server 20 from the TV 100 (Step S111). Regarding the acquisition source for the application, it may be recorded in the TV 100 in advance, or an application server storing the application may be retrieved from the TV 100 and specified.

The application which is acquired in the above-described Step S111 may be the same or different from the application which is acquired in Step S101 in FIG. 4.

Figure 6:
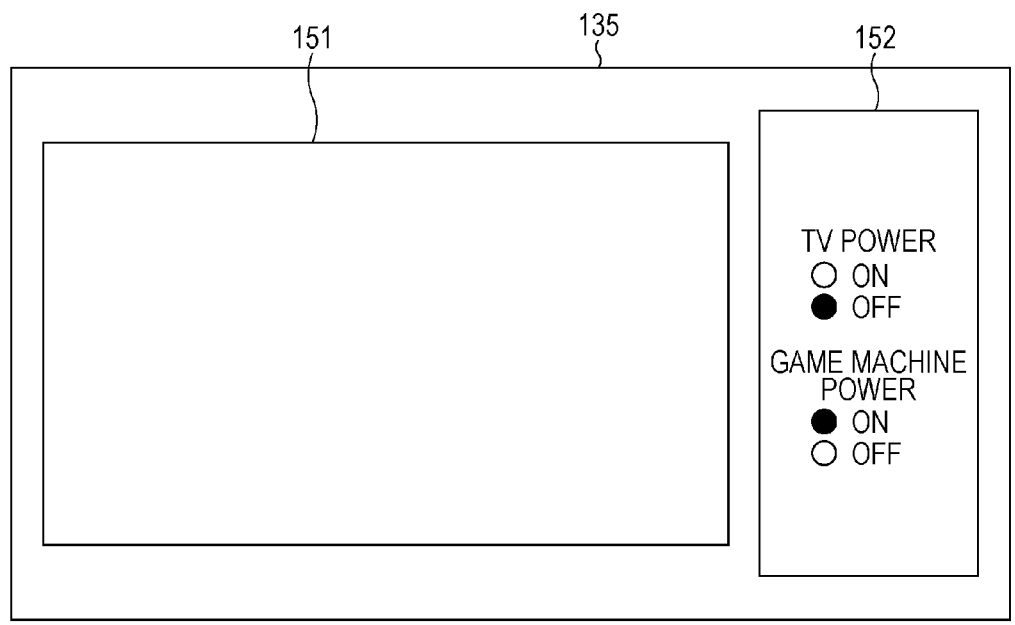
FIG. 6 is a diagram illustrating an example of the screen display of an application for controlling an operation of electronic equipment which is managed by an electric power information processor.

FIG. 6 is a diagram illustrating an example of the screen display of an application, which is executed by the TV 100, for controlling the operation of the electronic equipment which is managed by the electric power information processor 30. In the screen display example shown in FIG. 6, the TV 40 and the game machine 50 are shown as the electronic equipment which is managed by the electric power information processor 30 in the energy information display region 152 next to the video display region 151, and using the application, the information for controlling the electronic equipment which is managed by the electric power information processor 30 can be written in the electric power information database 11. In this manner, using the application which is displayed on the screen of the TV 100, the operation of the electronic equipment which is managed by the electric power information processor 30 can be remotely controlled.

In the above-described Step S111, when the TV 100 acquires the application for controlling the operation of the electronic equipment which is managed by the electric power information processor 30 by downloading from the application server 20, the application accesses the WWW server 12 and makes a request to write the information for controlling the operation of the electronic equipment which is managed by the electric power information processor 30 from the electric power information database 11 (Step S112).

In the above-described Step S112, when the application accesses the WWW server 12 and makes a request to write the information for controlling the operation of the electronic equipment which is managed by the electric power information processor 30 from the electric power information database 11, the WWW server 12 receiving the request writes the requested content in the electric power information database 11 on the basis of the request from the application (Step S113).

In the above-described Step S113, when the WWW server 12 writes the requested content in the electric power information database 11 on the basis of the request from the application, the electric power information processor 30 refers to the information, which is written in the electric power information database 11, for controlling the operation of the electronic equipment which is managed by the electric power information processor 30 at regular intervals, and prompts the electronic equipment which is managed by the electric power information processor 30 to be operated in accordance with the value thereof (Step S114).

For example, when the application which is executed by the TV 100 makes a request to the WWW server 12 to write information for turning off the electric power of the TV 40 in the electric power information database 11, and the WWW server 12 updates the electric power information database 11 on the basis of the request from the application, the electric power information processor 30 can detect the update of the information with reference to the electric power information database 11 through the WWW server 12. The electric power information processor 30 which detects the writing of the information for turning off the electric power of the TV 40 sends a command for turning off the electric power of the TV 40 which is managed by the electric power information processor 30 to the TV 40 on the basis of the detection.

Here, as the command for turning off the electric power of the TV 40 which his managed by the electric power information processor 30, a command which is designated by a protocol set in advance between the electric power information processor 30 and the TV 40 may be used, or a command for causing the electric power information processor 30 to forcibly block the current flowing to a tap to which the TV 40 is connected may be used.

For example, when the application which is executed by the TV 100 makes a request to the WWW server 12 to write information for changing the volume of the TV 40 in the electric power information database 11, and the WWW server 12 updates the electric power information database 11 on the basis of the request from the application, the electric power information processor 30 can detect the update of the information with reference to the electric power information database 11 through the WWW server 12. The electric power information processor 30 which detects the writing of the information for changing the volume of the TV 40 sends a command for changing the volume of the TV 40 which is managed by the electric power information processor 30 to the TV 40 on the basis of the detection.

In this manner, when an application is downloaded to the TV 100 and the electric power information database 11 is updated by using the application through the WWW server 12, the operation of the electronic equipment which is managed by the electric power information processor 30 can be controlled.

[1-5. Functional Configuration of Information Processor]

In the above description, an application is downloaded to the TV 100 to refer to or update the electric power information database 11 by using the application. The same process as above can also be performed in the personal computer 200 shown in FIG. 1. Hereinafter, the functional configuration of the personal computer 200 according to an embodiment of the present disclosure will be described.

Figure 7:
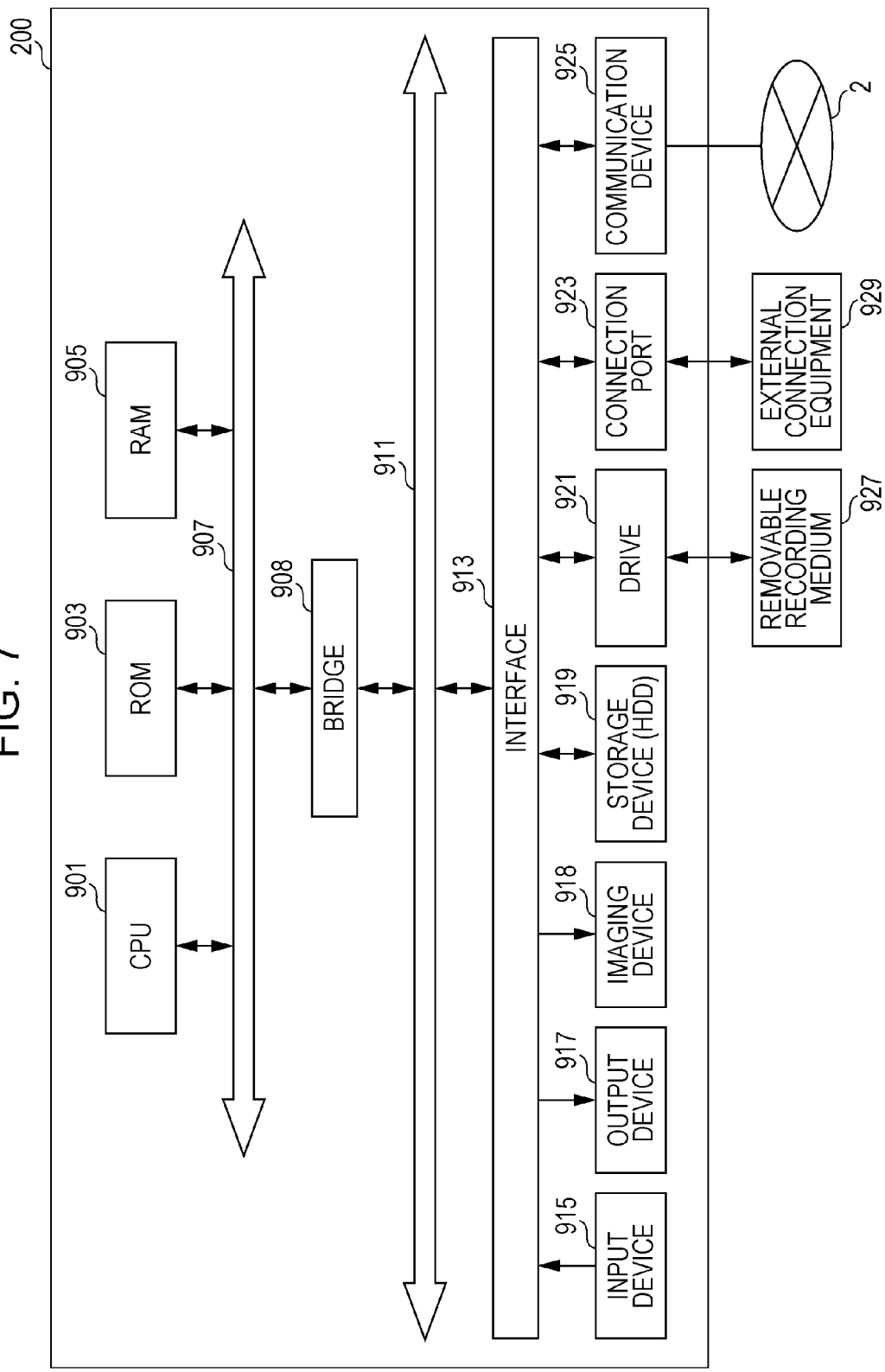
FIG. 7 is a diagram illustrating the functional configuration of a personal computer according to an embodiment of the present disclosure.

FIG. 7 is a diagram illustrating the functional configuration of the personal computer 200 according to an embodiment of the present disclosure. Hereinafter, the functional configuration of the personal computer 200 according to an embodiment of the present disclosure will be described using FIG. 7.

The personal computer 200 is mainly provided with a CPU 901, a ROM 903, a RAM 905, a host bus 907, a bridge 909, an external bus 911, an interface 913, an input device 915, an output device 917, an imaging device 918, a storage device 919, a drive 921, a connection port 923, and a communication device 925.

The CPU 901 functions as an operation processor and a control device, and controls all or some operations in the personal computer 200 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which appropriately change in the execution. These are connected to each other by the host bus 907 including an internal bus such as a CPU bus.

The host bus 907 is connected to an external bus 911 such as a peripheral component interconnect/interface (PCI) bus via the bridge 909.

The input device 915 is an operator which is operated by a user, such as a mouse, a keyboard, a touch panel, a button, a switch and a lever. In addition, the input device 915 may be, for example, a remote control unit (so-called remote control) using infrared light or other radio waves, or may be external connection equipment 929 such as a cell phone or a PDA corresponding to the operation of the personal computer 200. Furthermore, the input device 915 includes an input control circuit which generates an input signal on the basis of the information which is input by a user by using the above-described operator and outputs the input signal to the CPU 901. By operating the input device 915, a user of the personal computer 200 can input various pieces of data to the personal computer 200 or issue instructions for a processing operation.

The output device 917 includes a device which can visually or auditorily notify a user of the acquired information, such as a display device such as a CRT display device, a liquid crystal display device, a plasma display device, an EL display device and an EL lamp, an audio output device such as a speaker and a headphone, a printer, a cell phone, and a fax. The output device 917 outputs, for example, results which are obtained by various processes performed by the personal computer 200. Specifically, the display device displays the results which are obtained by various processes performed by the personal computer 200 with text or images. The audio output device converts an audio signal formed of the reproduced audio data, acoustic data or the like into an analog signal and outputs the converted signal.

The imaging device 918 is provided in, for example, an upper part of the display device, and can capture a static image or a dynamic image of a user of the personal computer 200. The imaging device 918 is provided with, for example a charge coupled device (CCD) or a complementary metal oxide semiconductor (CMOS) image sensor, and can captures a static image or a dynamic image by converting the light collected by a lens into an electric signal.

The storage device 919 is a device for data storage which is configured as an example of a storage section of the personal computer 200, and includes, for example, a magnetic storage device such as a hard disk drive (HDD), a semiconductor storage device, an optical storage device, a magneto-optical storage device, or the like. The storage device 919 stores programs which are executed by the CPU 901, various pieces of data, and acoustic signal data image signal data obtained from the outside.

The drive 921 is a reader/writer for a recording medium, and is attached inside or outside the personal computer 200. The drive 921 reads out the information recorded in a magnetic disk, an optical disc, a magneto-optical disc, or the removable recording medium 927 such as a semiconductor memory which is mounted, and outputs the information to the RAM 905. In addition, the drive 921 can write a record in a magnetic disk, an optical disc, a magneto-optical disc, or the removable recording medium 927 such as a semiconductor memory which is mounted. The removable recording medium 927 is, for example, a DVD medium, a Blu-ray medium, Compact Flash (CF) (registered trade name), a memory stick, a secure digital memory card (SD memory card), or the like. In addition, the removable recording medium 927 may be, for example, an integrated circuit card (IC card), electronic equipment, or the like equipped with a noncontact IC chip.

The connection port 923 is a port for directly connecting equipment such as a universal serial bus (USB) port, an IEEE 1394 port such as i.Link, a small computer system interface (SCSI) port, a RS-232C port, an optical audio terminal, and a high-definition multimedia interface (HDMI) port to the personal computer 200. By connecting the external connection equipment 929 to the connection port 923, the personal computer 200 directly acquires acoustic signal data and image signal data from the external connection equipment 929, or provides the acoustic signal data and the image signal data to the external connection equipment 929.

The communication device 925 is, for example, a communication interface including a communication device for connection to the network 2. The communication device 925 is, for example, a communication card for wired or wireless local area network (LAN), Bluetooth or wireless USB (WUSB), a router for optical communication, a router for asymmetric digital subscriber line (ADSL), a modem for various communications, or the like. For example, the communication device 925 can transmit and receive a signal and the like to and from the internet and other communication equipment in accordance with a predetermined protocol such as TCP/IP. In addition, the network 2 which is connected to the communication device 925 includes a wired or wireless-connected network, and may be, for example, the internet, LAN in the home, infrared communication, radio wave communication, satellite communication, or the like.

As described above, the functional configuration of the personal computer 200 according to an embodiment of the present disclosure has been described. When an application is downloaded from the application server 20 and is executed during the operation of such a personal computer 200, a user of the personal computer 200 can refer to the electric power consumption information of the electronic equipment which is managed by the electric power information processor 30, or control the operation of the electronic equipment which is managed by the electric power information processor 30 while operating the personal computer 200.

<2. Conclusion>

As described above, according to an embodiment of the present disclosure, an application is downloaded from the application server 20 to the TV 100 or the personal computer 200 which displays an image or a video and is executed. The application can refer to the electric power usage information, which is stored in the electric power information database 11, of the electronic equipment which is managed by the electric power information processor 30.

When such an application is executed in the TV 100 or the personal computer 200, the TV 100 or the personal computer 200 can refer to the electric power information database 11 while displaying an image or a video, and acquire the electric power usage information of the electronic equipment which is managed by the electric power information processor 30, thereby displaying the information on the screen. A user of the TV 100 or the personal computer 200 can see the electric power usage information of the electronic equipment which is managed by the electric power information processor 30 while watching the video which is displayed by the TV 100 or the personal computer 200, and thus the convenience when referring to the electric power usage information can be increased.

In addition, such an application can write the information for controlling the operation of the electronic equipment which is managed by the electric power information processor 30 in the electric power information database 11 through the WWW server 12. The electric power information processor 30 refers to the electric power information database 11 on a regular basis through the WWW server 12, and checks whether or not the information for controlling the operation of the electronic equipment is changed. On the basis of the content written in the electric power information database 11, the electric power information processor 30 can control the operation of the electronic equipment which is managed. Accordingly, a user of the TV 100 or the personal computer 200 can control the operation of the electronic equipment which is managed by the electric power information processor 30 while watching the video which is displayed by the TV 100 or the personal computer 200.

As described above, the preferred embodiments of the present disclosure have been described in detail with reference to the accompanying drawings, but the present disclosure is not limited thereto. It is obvious for those skilled in the art that various changes or modifications can be made within the scope of the technical concept described in the claims and belong to the technical scope of the present disclosure.

Figure 8:
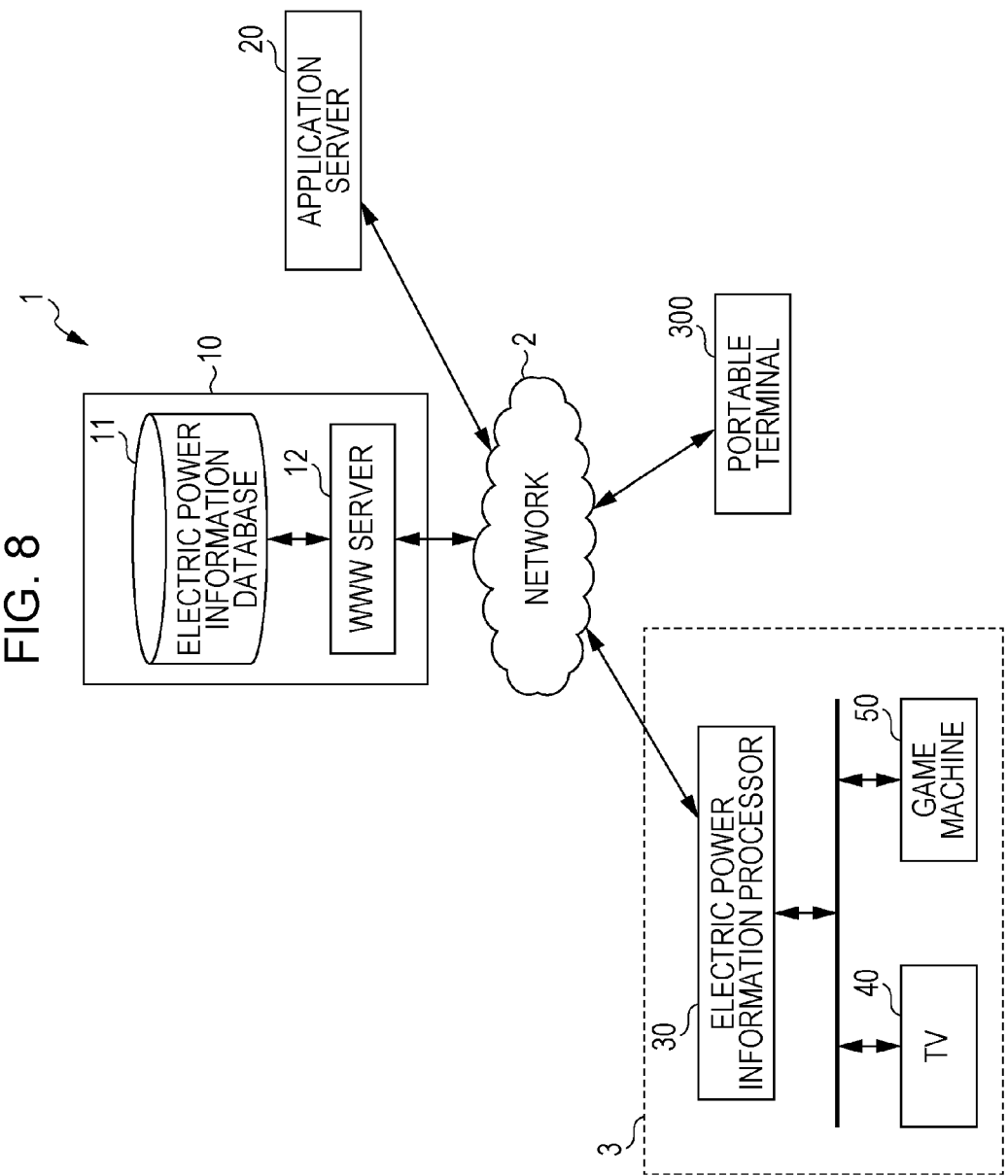
FIG. 8 is a diagram illustrating an example of the entire configuration of an energy display system including a display device according to an embodiment of the present disclosure.

For example, in the above-described embodiments, the electronic equipment which is managed by the electric power information processor 30, and the TV 100 or the personal computer 200 which displays the electric power usage information of the electronic equipment are provided in the home 3, but the present disclosure is not limited to such an example. For example, as shown in FIG. 8, a portable terminal 300 may display the electric power usage information of the electronic equipment which is managed by the electric power information processor 30, or control the operation of the electronic equipment which is managed by the electric power information processor 30. In that case, the portable terminal 300 may employ the same functional configuration as that of the personal computer 200 according to an embodiment of the present disclosure shown in FIG. 7.

In addition, for example, the application which is acquired from the application server 20 by the TV 100 may send information for controlling the operation of the electronic equipment which is managed by the electric power information processor 30 in accordance with a change in the acquired energy usage. At this time, the application may send information for controlling the backlight controller 141 and changing luminance of the screen in accordance with a change in the acquired energy usage.

In addition, for example, the application which is acquired from the application server 20 by the TV 100 may display pieces of equipment using electric power with icons on the display 135, and arrange the icons in descending order of electric power usage in accordance with a change in the acquired energy usage.

The present technique can also employ the following configurations.

(1) A display device including: an image display section which displays an image on a screen on the basis of an image signal; and an execution section which executes an application which is acquired from a network on the basis of a user's instruction, in which when the image display section displays an image, the application which is executed by the execution section acquires, through the network, information of energy usage which is used in a predetermined part, and displays the information on the screen.

(2) The display device according to (1), in which the application which is executed by the execution section sends information for controlling an operation of equipment consuming energy which is a source of the energy usage through the network.

(3) The display device according to (1) or (2), in which the application which is executed by the execution section displays the acquired energy usage information next to the image information which is displayed on the screen.

(4) The display device according to (1) or (2), in which the application which is executed by the execution section displays the acquired energy usage information to be superimposed on the image information which is displayed on the screen.

(5) The display device according to any one of (1) to (4), in which the application which is executed by the execution section sends information for controlling an operation of equipment consuming energy which is a source of the energy usage in accordance with a change in the acquired energy usage.

(6) The display device according to (5), in which the application which is executed by the execution section sends information for changing luminance of the screen in accordance with a change in the acquired energy usage.

(7) The display device according to (5), in which the application which is executed by the execution section displays pieces of equipment using electric power with icons on the screen, and arranges the icons in descending order of electric power usage in accordance with a change in the acquired energy usage.

(8) An energy display method including: displaying an image on a screen on the basis of an image signal; and executing an application which is acquired from a network on the basis of a user's instruction, in which when an image is displayed in the image display operation, the application which is executed in the execution operation acquires, through the network, information of energy usage which is used in a predetermined part, and displays the information on the screen.

(9) A computer program causing a computer to execute: displaying an image on a screen on the basis of an image signal; and executing an application which is acquired from a network on the basis of a user's instruction, in which when an image is displayed in the image display operation, the application which is executed in the execution operation acquires, through the network, information of energy usage which is used in a predetermined part, and displays the information on the screen.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
an image display section which displays a video image on a screen on the basis of a video image signal; and
an execution section which executes an application which is acquired from a network on the basis of a user's instruction,
wherein the image display section includes a video display region configured to display the video image based on the video image signal and an energy information display region configured to display at least first energy usage information of first electronic equipment that is consuming energy and second energy usage information of different second electronic equipment that is consuming energy;
wherein, when the video display region displays the video image based on the video image signal, the application which is executed by the execution section acquires, through the network, the first energy usage information of the first electronic equipment and the second energy usage information of the second electronic equipment, and the energy information display region displays the first energy usage information of the first electronic equipment and the second energy usage information of the second electronic equipment,
wherein the application which is executed by the execution section remotely controls operation of at least one of the first electronic equipment and the second electronic equipment, and sends information for controlling an operation of the at least one of the first electronic equipment and the second electronic equipment which is a source of the energy usage in accordance with a change in the acquired energy usage information through the network; and
wherein the application which is executed by the execution section displays pieces of equipment using electric power with icons on the screen, and arranges the icons in descending order of electric power usage in accordance with a change in the acquired energy usage.

2. The display device according to claim 1, wherein the application which is executed by the execution section displays the acquired energy usage information next to the video image which is displayed on the screen.

3. The display device according to claim 1, wherein the application which is executed by the execution section displays the acquired energy usage information to be superimposed on the video image which is displayed on the screen.

4. The display device according to claim 1, wherein the application which is executed by the execution section sends information for changing luminance of the screen in accordance with a change in the acquired energy usage.

5. An energy information display method comprising:
displaying a video image on a screen on the basis of a video image signal; and
executing an application which is acquired from a network on the basis of a user's instruction,
wherein the screen includes a video display region configured to display the video image based on the video image signal and an energy information display region configured to display at least first energy usage information of first electronic equipment that is consuming energy and second energy usage information of different second electronic equipment that is consuming energy;
wherein, when the video display region displays the video image based on the video image signal, the application which is executed acquires, through the network, the first energy usage information of the first electronic equipment and the second energy usage information of the second electronic equipment, and the energy information display region displays the first energy usage information of the first electronic equipment and the second energy usage information of the second electronic equipment,
wherein the application which is executed remotely controls operation of at least one of the first electronic equipment and the second electronic equipment, and sends information for controlling an operation of the at least one of the first electronic equipment and the second electronic equipment which is a source of the energy usage in accordance with a change in the acquired energy usage information through the network; and wherein the application which is executed by the execution section displays pieces of equipment using electric power with icons on the screen, and arranges the icons in descending order of electric power usage in accordance with a change in the acquired energy usage.

6. A non-transitory computer readable medium storing a computer program which, when executed, causes a computer to:

display a video image on a screen on the basis of a video image signal; and execute an application which is acquired from a network on the basis of a user's instruction, wherein the screen includes a video display region configured to display the video image based on the video image signal and an energy information display region configured to display at least first energy usage information of first electronic equipment that is consuming energy and second energy usage information of different second electronic equipment that is consuming energy;

wherein, when the video display region displays the video image based on the video image signal the application which is executed acquires, through the network, the first energy usage information of the first electronic equipment and the second energy usage information of the second electronic equipment, and the energy information display region displays the first energy usage information of first electronic equipment and the second energy usage information of the second electronic equipment, wherein the application which is executed remotely controls operation of at least one of the first electronic equipment and the second electronic equipment, and sends information for controlling an operation of the at least one of the first electronic equipment and the second electronic equipment which is a source of the energy usage in accordance with a change in the acquired energy usage information through the network; and wherein the application which is executed by the execution section displays pieces of equipment using electric power with icons on the screen, and arranges the icons in descending order of electric power usage in accordance with a change in the acquired energy usage.

* * * * *